Oct. 15, 1968  L. S. REGIS, JR  3,405,836
MAILING PACKAGE
Filed Aug. 19, 1966
3 Sheets-Sheet 1
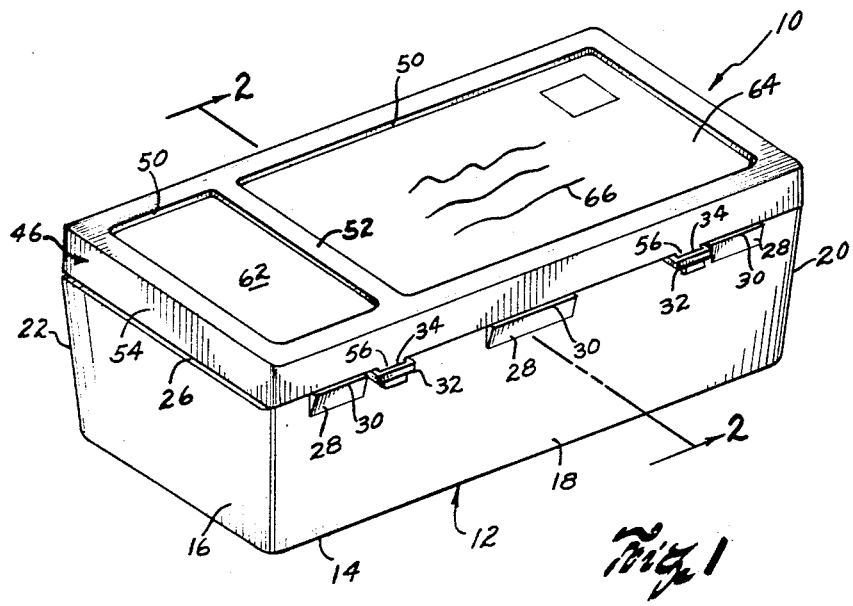
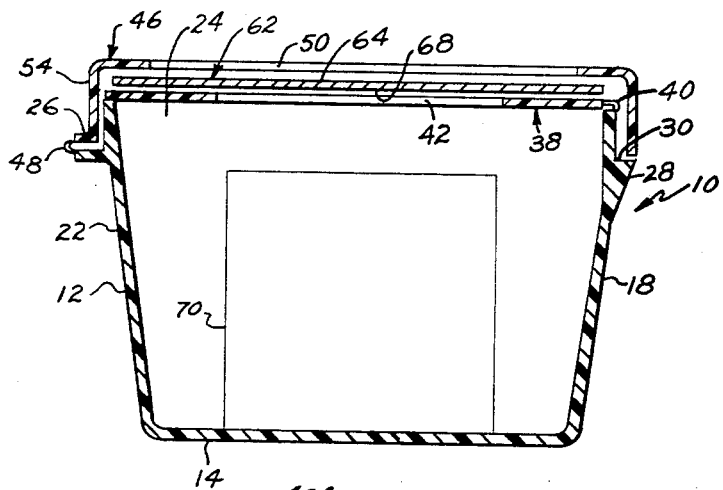
INVENTOR.
LEO STANLEY REGIS JR.
BY James P. McAndrew
ATTORNEY Oct. 15, 1968     L. S. REGIS, JR     3,405,836

MAILING PACKAGE

Filed Aug. 19, 1966     3 Sheets-Sheet 2

INVENTOR.
LEO STANLEY REGIS JR.

BY *James P. McAndrew*

ATTORNEY

INVENTOR.
LEO STANLEY REGIS JR.

BY *James P. McAndrew*

ATTORNEY

United States Patent Office 3,405,836
Patented Oct. 15, 1968

3,405,836
MAILING PACKAGE
Leo Stanley Regis, Jr., Sturbridge, Mass., assignor, by mesne assignments, to American Optical Corporation, a corporation of Delaware
Filed Aug. 19, 1966, Ser. No. 573,673
11 Claims. (Cl. 220—23)

ABSTRACT OF THE DISCLOSURE

A one-piece resilient plastic mailing package with a top and a flap integrally and hingedly molded to opposite side walls of the receptacle. The device provides an economical package for mailing spectacles between optometrists and optical laboratories that may be continuously remailed without damage to the package or its contents.

---

Figure 3:
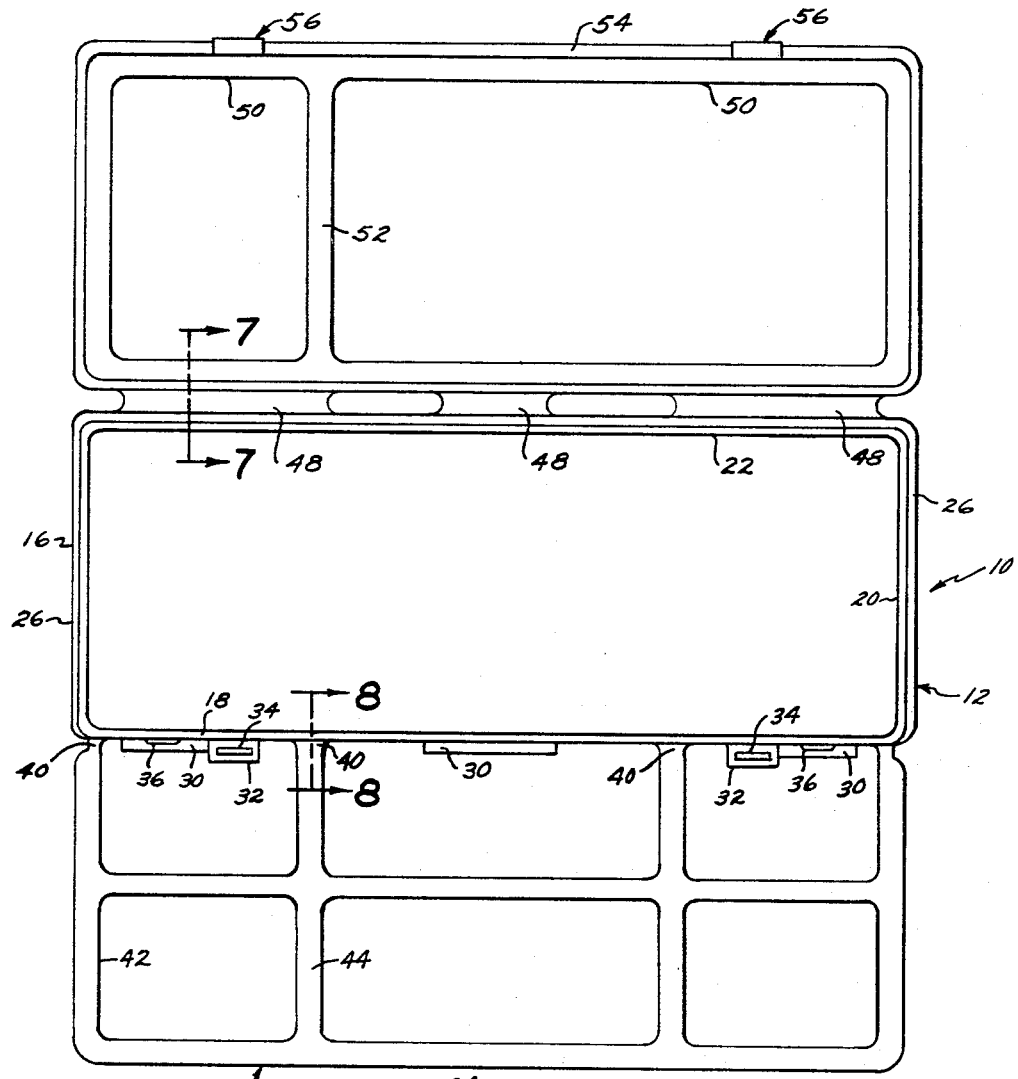

This invention relates to mailing packages and, more particularly, to a novel and improved one-piece plastic mailing package especially adapted for repeated reuse.

In the practice of optometry, there is usually a constant exchange of spectacle lenses and frames between optometrists, who prescribe and fit lenses and frames, and optical laboratories, which prepare and mount lenses in frames. That is, spectacles prepared to each patient's prescription are usually delivered to optometrists by mail from optical laboratories and, in many instances, optometrists will send a patient's existing frame and lenses to an optical laboratory to obtain replacement of the lenses or frame. Because of the fragile nature of the spectacles, a mailing package of substantial strength is required for this purpose.

It is an object of this invention to provide a novel and improved mailing package; to provide such a package which is especially suited for mailing spectacles; to provide such a package which is suitably strong to furnish adequate protection for spectacles mailed in the package; to provide such a package which is convenient to use and which is convenient to store when not in use; and to provide such a package which is adapted to be reused repeatedly over a long period of time.

Briefly described, the mailing package provided by this invention is formed in one piece of a suitably rigid plastic material. The package comprises a receptacle having a bottom wall, four side walls connected together to extend entirely around the bottom wall, and an open top, the side walls preferably tapering outwardly toward the open top of the receptacle so that the interior dimensions of the receptacle top exceed the exterior dimensions at the bottom of the receptacle. An integral flap is connected to the top of one of the receptacle side walls by an integral hinge for movement between a first position extending over the open top of the receptacle to rest on top of the other receptacle side walls and a second position extending away from the receptacle for permitting access to the receptacle through its open top. An integral cover is also connected to an opposite side wall of the receptacle by an integral hinge for movement between a position extending over said open receptacle top and a second position extending away from the receptacle for permitting access to the receptacle through its open top, the cover in its first position serving to hold an address-bearing card between the cover and the integral flap previously described. The cover has an aperture for permitting viewing of the address-bearing card and preferably has a flange extending entirely around the cover for fitting closely around the integral flap, the address-bearing card and the top of the side walls of the open receptacle when the flap and cover are in their first positions. The package also includes integral releasable latch means for normally holding said cover and flap in their first positions during mailing of the package.

Figure 4:
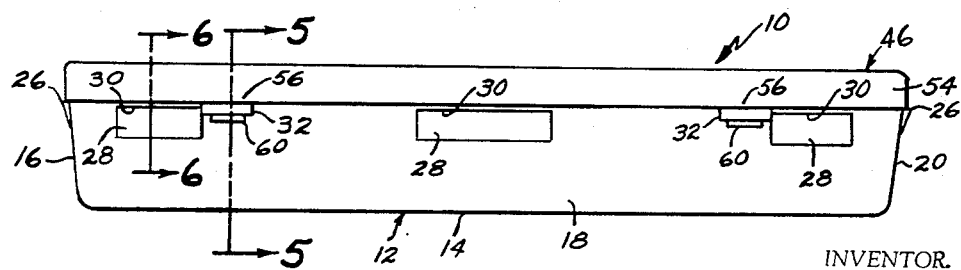
Figure 5:
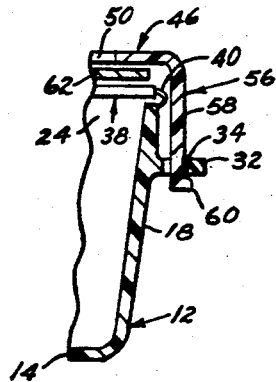
Figure 6:
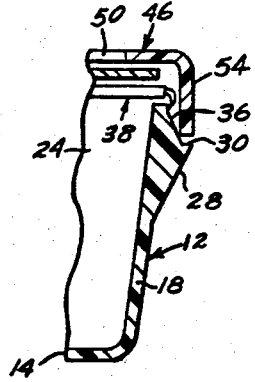
Figure 7:
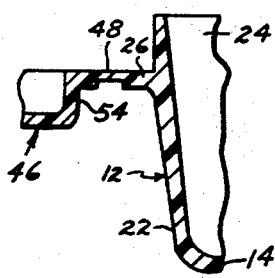
Figure 8:
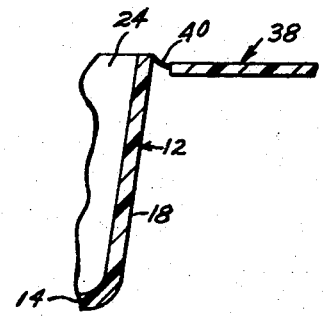

Other objects, advantages and details of the mailing package of this invention appear in the following detailed description of a preferred embodiment of the invention, the description referring to the drawings in which:

FIG. 1 is a perspective view of the mailing package of this invention;
FIG. 2 is a section view along line 2—2 of FIG. 1;
FIG. 3 is a plan view of the mailing package of FIG. 1 showing the integral flap and cover in open position;
FIG. 4 is a front elevation view of the package shown in FIG. 1;
FIG. 5 is a section view along line 5—5 of FIG. 4;
FIG. 6 is a section view along line 6—6 of FIG. 4;
FIG. 7 is a section view along line 7—7 of FIG. 3; and
FIG. 8 is a section view along line 8—8 of FIG. 3.

Referring to the drawings, 10 in FIGS. 1–4 indicates the novel and improved mailing package of this invention which is shown to be formed in one piece, preferably of a suitably rigid molded plastic such as polypropylene. The package includes a receptacle 12 having a bottom wall 14, four side walls 16, 18, 20 and 22 which are connected together to extend entirely around the bottom wall, and an open top 24. The side walls of the receptacle all taper outwardly from bottom to top so that the interior dimensions of the receptacle at its open top exceed the exterior dimensions of the receptacle at the receptacle bottom, the taper being sufficient to permit substantial nesting of the bottom of one receptacle 12 within the receptacle of another identical package 10. The interior of the receptacle is free of any projection in order to permit and facilitate this nesting. At least the bottom portion of the exterior of the receptacle is also preferably free of projections for facilitating nesting of the package 10.

As illustrated, the side walls 16, 20 and 22 of the receptacle 12 are preferably shaped to provide an integral shoulder 26 which extends around the side walls spaced a short distance from the open top 24 of the receptacle. Projections 28 are also preferably formed on the side wall 18 of the receptacle to provide separated shoulders 30 which are spaced at about the same selected distance from the open top of the receptacle. In addition, two integral bosses 32, slotted as at 34, are formed on the receptacle side wall 18. See FIG. 3. Integral wedge-shaped projections 36 are also preferably formed on the side wall 18. These projections 36 are located nearer the top of the receptacle 12 than the shoulders 30 and taper outwardly from the side wall 18 extending from the top to the bottom of the projections. See FIGS. 3 and 6.

An integral flap 38 is connected to the top of the side wall 18 by integral hinge means 40 for movement between a first closed position (shown in FIGS. 1 and 2) extending over the open top 24 of the receptacle 12 to rest upon the tops of the other receptacle side walls 16, 20 and 22, and a second open position (shown in FIG. 3) extending away from the receptacle 12 for permitting access to the receptacle through its open top. The flap is preferably apertured as at 42 to reduce its weight but preferably includes sufficient integral cross-members 44, and is of sufficient thickness, to provide the flap with significant rigidity. The flap is preferably proportioned to just extend over the tops of the receptacle side walls without extending outwardly beyond the side walls to any great extent. The integral hinge means 40 comprises a thin section of the plastic package material which is thin enough to flex readily and repeatedly without breaking. A thickness of material on the order of .010 inches is found to provide a suitable hinge for the purposes of this invention. The hinge means 40 are preferably connected to the flap 38 at locations of the flap cross-members 44 as shown in FIG. 3.

An integral cover 46 is connected to an opposite side wall 22 of the receptacle 12 by integral hinge means 48 for movement between a first closed position (shown in FIGS. 1 and 2) extending over the flap 38 and the open receptacle top 24 and a second open position (shown in FIG. 3) extending away from the receptacle 12 for permitting access to the receptacle through its open top. The cover is provided with one or more relatively large apertures or windows 50, preferably separated by one or more cross-members 52, and preferably has a flange 54 extending entirely around the cover. The integral hinge means 48 are similar to the hinge means 40 previously described and are connected to the receptacle side wall 22 at the top of the shoulder 26 and to the cover 46 at the bottom of the cover flange 54. The hinge means 48 are preferably connected to the cover flange near the ends of the cover and near the cross-member 52 as shown in FIG. 3.

As illustrated, the cover flange 54 is provided with integral hook-shaped latch portions 56 which include a tang 58 extending downwardly from the cover flange and an outwardly turned hook 60 as shown in FIG. 5. In this construction, as the cover is being moved toward the first cover position shown in FIG. 1, the tangs of the latch portions 56 are proportioned to first insert the latch hooks 60 into the slots 34 of the receptacle bosses 32. As the cover is moved further toward said first cover position, the cover flange 54 is adapted to engage the wedge-shaped projections 36 on the receptacle to be wedged outwardly from the receptacle side wall 18. As this wedging of the cover flange occurs, the latch portions 56 also move outwardly from the receptacle to engage the hooks 60 of the latch portions under the bosses 32 for releasably holding the cover in said first cover position. The cover flange 54 is proportioned to fit closely around the integral flap 38 and the top portions of the receptacle 12 to rest upon the receptacle shoulders 26 and 30 when the flap and cover are in their first positions as shown in FIG. 3. As will be understood, when a slight pressure is exerted on the bottom edge of the cover flange 54 with the thumbs between the separated shoulders 30, the latch portions 56 will flex slightly and release engagement with the receptacle bosses 32 for permitting moving of the cover to its second or open position.

In accordance with this invention, a card 62 of stiff paper or cardboard material is provided on one side 64 with an address 66 as illustrated in FIG. 1. Where the package is to be used repeatedly for mailing between the same two parties such as an optical laboratory and an optometrist, the address (not shown) of the second party is preferably placed on the reverse side 68 of the card. The card is preferably proportioned to be coextensive with the flap 38 for closing all apertures in the flap and is adapted to be held securely between the cover and flap when the cover is latched in its first or closed position. The card is shown spaced from the flap and cover in FIG. 2 for clarity of illustration but is preferably held securely between the flap and cover with a light clamping force.

The mailing package described above is very convenient to use and is sufficiently rigid for use in sending spectacle frames and lenses through the mail. For example, a pair of spectacles indicated diagrammatically in FIG. 2 by the lines 70 is easily placed in the receptacle 12 at an optical laboratory when the package flap and cover are in the positions shown in FIG. 3. The flap 38 is then conveniently folded over on top of the receptacle 12, an address-bearing card 62 like a postal card is placed on top of the flap, and the cover 46 is moved to its first or closed position for automatically engaging the integral latch portions 56 in the receptacle bosses 32 for holding the package closed. The cover 46 holds the flap in closed position and holds the card 62 securely over the apertures in the flap for completely enclosing the spectacles within the receptacle 12 and for exposing the address on the card 62 to view through the cover apertures 50. Engagement of the cover flange with the receptacle shoulders 26 and 30 assures that the cover will remain in place during mailing even though the package may become pressed by other packages during mailing.

When the package is received by an addressee such as an optometrist, the package is easily opened by applying pressure to the underside of the cover flange with the thumbs between the receptacle shoulders 30. If the optometrist wishes to use the package for sending a pair of spectacles back to the optical laboratory, he places the spectacles within the package, reverses the card 62, and recloses the package flap and cover to hold the card between the flap and cover with the address on the card side 68 exposed to view. During opening and closing of the package 10, the integral package flap and cover are always in convenient position to be opened or closed. Further, if the optometrist wishes to keep the package, or a group of such packages, on hand for use when required, the package flap and cover never become misplaced but remain integral with the package. Further because the packages are nestable as above described the packages can be compactly stored by the optometrist. Because of this nesting capability, a supply of the packages also requires very little shipping space and can be inexpensively shipped to an optometrist from an optical laboratory or other supplier. As will be understood, the package is adapted to be reused a great many times.

It should be understood that this mailing package has been described by way of illustration and that this invention includes all modifications and equivalents thereof which fall within the scope of the appended claims.

I claim:

1. A one-piece plastic mailing package comprising a receptacle having a bottom, side wall means extending entirely around said bottom, and an open top; an integral flap connected to said side wall along one side of said open top by an integral hinge for movement between a first position extending over said open receptacle top and a second position extending away from said receptacle permitting access to said receptacle through said open top; an integral cover connected to said side wall along the side of said opening opposite said hinge of said integral flap by an integral hinge for movement between a first position extending over said open receptacle top for holding an address-bearing card between said cover and flap and a second position extending away from said receptacle permitting access to said receptacle through said open top, said cover having an aperture permitting viewing said address-bearing card through said cover; and integral releasable latch means for normally holding said flap and cover in said first flap and cover positions.

2. A package as set forth in claim 1 wherein said flap rests against the top of said side wall around said open receptacle top when said flap is in said first flap position.

3. A package as set forth in claim 2 wherein said flap is apertured for reducing its weight.

4. A package as set forth in claim 1 wherein said flap and cover are hingedly connected to said side wall at opposite sides of said open receptacle top.

5. A package as set forth in claim 1 wherein said receptacle side wall tapers outwardly from said bottom to said top so that the interior dimensions of said open receptacle top exceed the exterior dimensions of said receptacle bottom for permitting nesting of one said package receptacle within another said package receptacle with said flap and cover in said second flap and cover positions.

6. A package as set forth in claim 1 wherein said cover has a flange extending entirely around said cover for fitting closely around said flap and said receptacle side wall at said open receptacle top with said flap and cover in said first flap and cover positions.

7. A one-piece plastic mailing package comprising a receptacle having a bottom wall, four side walls connected together to extend entirely around said bottom wall, and an open top, said side walls tapering outwardly from said bottom to said top so that the interior dimensions of said open top exceed the exterior dimensions of said receptacle bottom; an integral flap connected to the top of one of said side walls by an integral hinge for movement between a first position extending over said open receptacle top resting on top of said other side walls and a second position extending away from said receptacle permitting access to said receptacle through said open top; an integral cover connected to an opposite side wall by an integral hinge for movement between a first position extending over said open receptacle top for holding an address-bearing card between said cover and flap and a second position extending away from said receptacle permitting access to said receptacle through said open top, said cover having an aperture permitting viewing said card through said cover and having a flange extending entirely around said cover for fitting closely around said flap and said side walls at said open receptacle top with said flap and cover in said first flap and cover positions; and integral releasable latch means for normally holding said flap and cover in said first flap and cover positions.

8. A package as set forth in claim 7 wherein said releasable latch means comprise hook-shaped latch portions on said cover flange oppositely of said cover hinge and integral bosses on said one receptacle side wall slotted to receive and releasably engage said hook-shaped latch portions with said cover in said first cover position.

9. A package as set forth in claim 8 wherein said receptacle side walls have integral shoulder means engaging said cover flange in said first cover position.

10. A package as set forth in claim 8 wherein said one side wall has integral wedge-shaped projections to engage said cover flange for guiding said hook-shaped latch portions into releasable engagement with said slotted bosses.

11. The combination of a package as set forth in claim 7 and an address-bearing card.

References Cited

UNITED STATES PATENTS

| | | | |
|---|---|---|---|
| 1,405,002 | 1/1922 | Rhodes | 40—312 |
| 2,249,657 | 7/1941 | Junkin. | |
| 2,811,768 | 11/1957 | Axelson. | |
| 3,169,659 | 2/1965 | Blackmore. | |

FOREIGN PATENTS

| | | |
|---|---|---|
| 300,526 | 9/1965 | Netherlands. |
| 542,075 | 6/1957 | Canada. |

THERON E. CONDON, *Primary Examiner.*

G. E. LOWRANCE, *Assistant Examiner.*